(12) United States Patent
Ahler et al.

(10) Patent No.: US 9,626,538 B2
(45) Date of Patent: Apr. 18, 2017

(54) METHOD AND SYSTEM FOR INCREASING THE OPERATIONAL SAFETY OF MOBILE MACHINES IN ABOVEGROUND OR UNDERGROUND MINING OPERATIONS FOR THE EXTRACTION OF MINERALS BY UTILIZING THE RFID TECHNOLOGY

(71) Applicant: Caterpillar Global Mining Europe GmbH, Lunen (DE)

(72) Inventors: Marco Ahler, Muhlheim a.d.R. (DE); Sascha Stelter, Dorsten (DE); Christian Hauck, Dortmund (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 289 days.

(21) Appl. No.: 14/353,257

(22) PCT Filed: Oct. 26, 2012

(86) PCT No.: PCT/EP2012/004486
§ 371 (c)(1),
(2) Date: Apr. 21, 2014

(87) PCT Pub. No.: WO2013/060469
PCT Pub. Date: May 2, 2013

(65) Prior Publication Data
US 2014/0253292 A1 Sep. 11, 2014

(30) Foreign Application Priority Data
Oct. 28, 2011 (DE) .................. 10 2011 054 926

(51) Int. Cl.
*G06K 7/10* (2006.01)
*E21F 17/18* (2006.01)
*G01S 5/00* (2006.01)

(52) U.S. Cl.
CPC .......... *G06K 7/10366* (2013.01); *E21F 17/18* (2013.01); *G01S 5/0045* (2013.01)

(58) Field of Classification Search
None
See application file for complete search history.

(56) References Cited

U.S. PATENT DOCUMENTS 4,722,574 A * 2/1988 Barham .................. E21D 23/12
299/1.05
5,440,310 A * 8/1995 Schreiner .............. G01S 13/343
342/124

(Continued)

FOREIGN PATENT DOCUMENTS

CN  1924609  3/2007
CN  101725370  6/2010

(Continued)

OTHER PUBLICATIONS

International Search Report regarding International Application No. PCT/EP2012/004486, dated Jan. 31, 2013, 3 pages.

*Primary Examiner* — Quan-Zhen Wang
*Assistant Examiner* — Chico A Foxx

(57) ABSTRACT

A system and method for increasing the operational safety of mobile machines in mining operations by utilizing RFID technology includes a transmitting unit at the mobile machine, a receiving unit, and a non-machine-related RFID transponder which can be activated by the transmitting unit and in the case of activation is contactlessly detected. A reference transponder and a control unit for actuating the transmitting unit and evaluating transponder signals in measuring cycles is provided. To improve the energy requirement of the method and system, the reference transponder may be mounted on the mobile machine at a defined distance, stored in the control unit, from the transmitting unit. The signal field strength L of the transmitter signal of (Continued)

the transmitting unit may be changed in dependence on the response signal of the reference transponder in a calibration cycle (KCB) for eliminating the environmental influences.

20 Claims, 6 Drawing Sheets

(56) References Cited

U.S. PATENT DOCUMENTS

| | | | |
|---|---|---|---|
| 6,339,709 B1 * | 1/2002 | Gladwin | G01S 5/02 342/465 |
| 6,512,312 B1 | 1/2003 | Herkenrath et al. | |
| 8,115,622 B2 * | 2/2012 | Stolarczyk | H01Q 1/04 340/539.13 |
| 8,651,581 B2 * | 2/2014 | Weigel | E21F 17/18 299/1.6 |
| 9,152,908 B2 * | 10/2015 | Ahler | E21F 17/18 |
| 2006/0087443 A1 * | 4/2006 | Frederick | E21C 35/24 340/686.6 |
| 2008/0001714 A1 | 1/2008 | Ono et al. | |
| 2009/0109049 A1 * | 4/2009 | Frederick | F16P 3/14 340/686.6 |
| 2009/0231958 A1 * | 9/2009 | Wei | G01S 5/0252 367/118 |
| 2010/0227557 A1 * | 9/2010 | Won | H04Q 9/00 455/41.2 |
| 2011/0309931 A1 * | 12/2011 | Rose | E21F 17/18 340/539.13 |

FOREIGN PATENT DOCUMENTS

| | | |
|---|---|---|
| EP | 1940090 A2 | 7/2008 |
| GB | 180029 A | 3/1987 |
| WO | WO 2011/121500 A2 | 10/2011 |

* cited by examiner

METHOD AND SYSTEM FOR INCREASING THE OPERATIONAL SAFETY OF MOBILE MACHINES IN ABOVEGROUND OR UNDERGROUND MINING OPERATIONS FOR THE EXTRACTION OF MINERALS BY UTILIZING THE RFID TECHNOLOGY

CROSS-REFERENCE TO RELATED APPLICATIONS

This application claims the benefit of priority as a national phase entry of International Patent Application No. PCT/EP2012/004486 filed on Oct. 26, 2012, which claims the benefit of priority to German Patent Application Number 102011054926.9, having a filing date of Oct. 28, 2011, the complete disclosures of which are hereby incorporated by reference for all purposes.

TECHNICAL FIELD

The present disclosure relates to a method for increasing the operational safety of mobile machines in aboveground or underground mining operations for the extraction of minerals by utilizing RFID technology, comprising at least one transmitting unit at the mobile machine, with at least one receiving unit at the mobile machine, with at least one non-machine-related RFID transponder which can be activated by means of a transmitter signal of the transmitting unit and in the case of activation is contactlessly detected by means of the receiving unit, with at least one reference transponder and with a control unit for driving the transmitting unit and evaluating transponder signals detected by means of the receiving unit in measuring cycles. The present disclosure also relates to a system for increasing the operational safety of mobile machines in aboveground or underground mining operations for the extraction of minerals by utilizing the RFID technology, comprising at least one transmitting unit at the mobile machine, with at least one receiving unit at the mobile machine, with at least one non-machine-related RFID transponder which can be activated by means of a transmitter signal of the transmitting unit and contactlessly detected by means of the receiving unit, with at least one reference transponder and with a control unit for actuating the transmitting unit and evaluating transponder signals detected by means of the receiving unit in a measuring cycle.

BACKGROUND

From WO 2011/121500 A2 a method for locating persons and/or mobile machines in mine workings by utilizing the RFID technology is known. In order to be able to reliably locate persons or machines with minimized use of energy of the plant, neighbouring transmitting units are driven in such a manner that they radiate their transmitter signals in succession so that information about the current location of the machine or person provided with a tag can be obtained from the position of a receiving unit which first receives a transponder signal of an activated personal or machine tag. By changing the signal field strength of the transmitter signal, it is then possible to draw a conclusion with respect to the distance of the tag from the nearest receiving unit. For a face surveillance system with shield supports, conveyor and extraction machine moving along the conveyor, a reference tag can be provided additionally at the conveyor in order to ensure via the reception of the transponder signal of the reference tag that the transmitter signal radiated completely covers the space located between the reference transponder and transmitting unit and to be surveyed because it is only this space which forms a possible habitable space for persons or personal tags worn by them.

An object of the present disclosure might be to increase the operational safety of the RFID technology. A further optimization of the energy consumption might also be of interest.

SUMMARY

An aspect of the present disclosure refers to a method which may comprise mounting a reference transponder on a mobile machine at a defined distance, stored in a control unit, from a transmitting unit. The signal field strength of the transmitter signal of the transmitting unit may be changed, particularly increased or reduced, in dependence on the response signal of the reference transponder in a calibration cycle for optimizing a measurement signal field strength for the subsequent measuring cycle or cycles for eliminating the environmental influences.

According to an exemplary embodiment of the present disclosure, the transmitting unit and at least one associated reference tag as calibration tag may are therefore arranged at the same machine as, for example, a support shield or a continuous miner or at a uniform invariable distance from the transmitting unit, respectively. The signal field strength of the transmitter signal for the subsequent measuring cycle or calibration cycle may be changed taking into consideration the response signal of the reference transponder and its defined distance from the transmitting unit. Since the effective signal wave of the transmitter signal changes due to environmental influences such as, e.g., distance of a shield cap from the shield runner, position of the extraction machine relative to the transmitting unit, presence of other metallic masses such as, e.g., support facilities etc. and, furthermore, the signal field strength of the signal field also decreases in relation to distance, a self calibration of each transmitting unit, and thus an optimization of the energy balance of the entire system might be achieved via the defined ratio of distance of transmitting unit and associated reference or calibration tag. By means of the calibration cycle, the transmitting power of the transmitting unit might be continuously controlled for the subsequent measuring cycle. A calibration cycle can be a separate cycle or also form a part-section of a measuring cycle and measuring cycle and calibration cycle can run sequentially. A calibration cycle can be performed between the measuring cycles but also in parallel with a measuring cycle. At the same time, the presence of a reference tag arranged at a fixed distance may provide due to a suitable conduct of the method a relatively precise distance determination between a detected machine or personal tag and the transmitter of the mobile machine.

The variation of the purely distance-related drop in signal field strength might essentially depend on the output power of the transmitter signal and the transmitting frequency, wherein the signal field strength drops approximately with the third power of distance in the near field and essentially proportionally to the distance in the far field. The environmental influences provide for a detuning of this distance-related ratio which is utilized for the method and system according to the present disclosure.

According to an exemplary embodiment of the present disclosure, the calibration cycle may be performed at predetermined intervals between the measuring cycles or in parallel therewith. As an alternative, the calibration cycle might be started when no non-machine-related transponder signal is detected by the receiving unit in a measuring cycle.

A calibration cycle may consist of one or more part-cycles, wherein, according to one possible variant of the method, the signal field strength is iteratively changed from part-cycle to part-cycle until a reference limit signal field strength is established, the undercutting of which does not result in an activation of the reference transponder. Such a conduct of the method might be available especially in the case of tags which deliver a predefined transponder signal only on activation. The transmitting unit can then suitably send out a transmitter signal in a signal field strength which, taking into consideration the reference limit signal field strength, covers a predetermined minimum safety range around the transmitting unit preferably in a measuring cycle immediately following the calibration cycle. By means of the control unit, a proportional factor can be derived from the reference limit signal field strength for this purpose, since the distance of the reference transponder from the transmitting unit is known, and a basic reference field strength, by which factor the reference limit signal field strength must be increased so that non-machine-related transponders such as, in particular, personal tags are detected within a safety radius around the transmitting unit.

According to an alternative exemplary embodiment of the present disclosure, the signal field strength actually arriving at the reference transponder may be measured and delivered back to the transmitting unit or control unit, respectively, as signal field strength measurement value. For this purpose, it might be particularly advantageous if the reference transponder is provided with a signal field strength measuring device for the incoming signal field strength of the transmitter signal and with a communication device for communicating the measured signal field strength measurement values to the control unit of the transmitting unit. The measuring device can also consist, for example, of the antenna of the reference tag and a suitable circuit which detects the received antenna power and provides it as measurement value or measure of the incoming signal field strength. The energy picked up by the antenna of the reference tag then possibly forms the measurement value. By measuring the signal field strength arriving at the reference or calibration transponder, the signal field strength of the transmitting unit can then be corrected in dependence on this measured signal field strength and taking into consideration the known distance of the reference transponder from the transmitting unit, in such a manner that a desired safety range around the transmitting unit is monitored. For this purpose, the signal field strength might be adjusted in dependence on the signal field strength measurement value for the subsequent measuring cycle. The signal field strength of the transmitter signal for the subsequent measuring cycle or calibration cycle can be controlled, in particular, in such a manner that the signal field strength measurement value measured at the reference transponder essentially corresponds to a reference signal field strength predetermined for the reference transponder so that therefore approximately always the same effective signal field strength arrives at the reference transponder. Since the area to be monitored is significantly larger than the approximately circular area around the transmitting unit covered over the distance of the reference tag, especially when the reference tag must be arranged close to the transmitting unit because of the constructional situation of the extraction machine, the reception characteristic of the antenna of the reference tag can also be changed by electrical means in order to avoid excessively high measured antenna powers or signal field strengths at the reference tag.

According to another exemplary embodiment of the present disclosure, the signal field strength actually arriving at the reference transponder may be used for changing the measured signal field strength for the subsequent measuring or calibration cycle. For this purpose, the reference transponder could be activated only with the presence of a reference signal field strength as activation signal field strength and the signal field strength of the transmitter signal is controlled in the calibration cycle for the subsequent measuring cycle or calibration cycle in such a manner that the signal field strength arriving at the reference transponder essentially corresponds to its reference signal field strength at which it is activated. However, a method conduct at which the incoming signal field strength is measured by means of the reference tag is more advantageous.

In a system for increasing the operational safety of mobile machines in aboveground or underground mining operations for extracting minerals by utilizing the RFID technology, the above objective is achieved, according to the present disclosure, in that the reference transponder is mounted at the mobile machine at a defined distance, stored in the control unit, from the transmitting unit, wherein the signal field strength of the transmitter signal is changeable and a calibration cycle is provided for eliminating the environmental influences, in which calibration cycle the signal field strength of the transmitter signal of the transmitting unit is changed in dependence on the response signal of the reference transponder.

According to another exemplary embodiment of the disclosed system, the reference transponder may have a response field strength which must arrive at least at the reference transponder so that the reference transponder is activated. A calibration cycle can then consist of one or more part-cycles, wherein a reference limit signal field strength can be determined by iteratively changing the signal field strength, the undercutting of which does not result in an activation of the reference transponder because the signal field strength arriving at the distance of the reference transponder from the transmitting unit is lower than the response field strength. The signal field strength of the transmitter signal for the next measuring cycle can then be corrected proportionally, taking into consideration the distance between transmitting unit and reference transponder and the safety range to be covered which is to be achieved in order to perform the next measuring cycle with a signal field strength with optimally corrected energy. The reference limit signal field strength is changed by different environmental influences and by comparing the currently required reference limit signal field strength with a machine-characteristic reference limit signal field strength, the changing factor for the transmitted power can be determined.

According to another exemplary embodiment of the present disclosure, the reference transponder may be provided with a signal field strength measuring device for the incoming signal field strength of the transmitter signal and with a communication device for communicating the signal field strength measurement value to the control unit of the transmitting unit. The measuring device can also consist, for example, of the antenna of the reference tag and a suitable circuit which detects the received antenna power and provides it as measurement value or measure of the incoming signal field strength. The signal field strength of the transmitter signal for the subsequent measuring cycle or calibration cycle can then especially be controlled in such a manner that the signal field strength measurement value measured at the reference transponder essentially corresponds to a reference signal field strength predetermined for the reference transponder. As an alternative or additionally, the reference transponder can be designed for a reference signal field strength as activation signal field strength.

A first possible field of application for the method and the system is a face, wherein the mobile machine is formed by a support shield of a shield support and the non-machine-related transponder is a personal tag and/or a machine tag attached to an extraction machine which can be moved along a conveying device. Transmitting unit and reference transponder may be then both located at the shield support.

A second possible field of application for the method and the system relates to mobile extraction machines with an undercarriage, particularly a tracked undercarriage, wherein at least two transmitting units and two reference transponders, preferably four transmitting units and four reference transponders, are attached to the machine frame of the movable extraction machine.

BRIEF DESCRIPTION OF THE DRAWINGS

Further advantages and exemplary embodiments of the method and of the system according to the present disclosure may be obtained from the subsequent description of illustrative embodiments shown diagrammatically greatly simplified in the drawing, in which.

DETAILED DESCRIPTION

Figure 1:
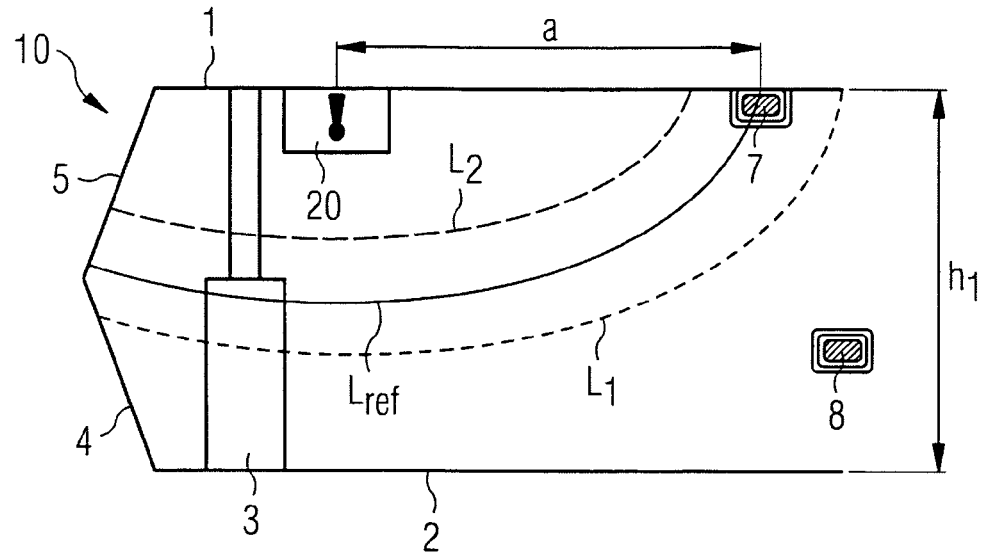
FIG. 1 shows diagrammatically greatly simplified by means of a support shield with base station and reference transponder in a first extended height the variations of signal field strengths occurring at different distances around the transmitting unit.
Figure 2:
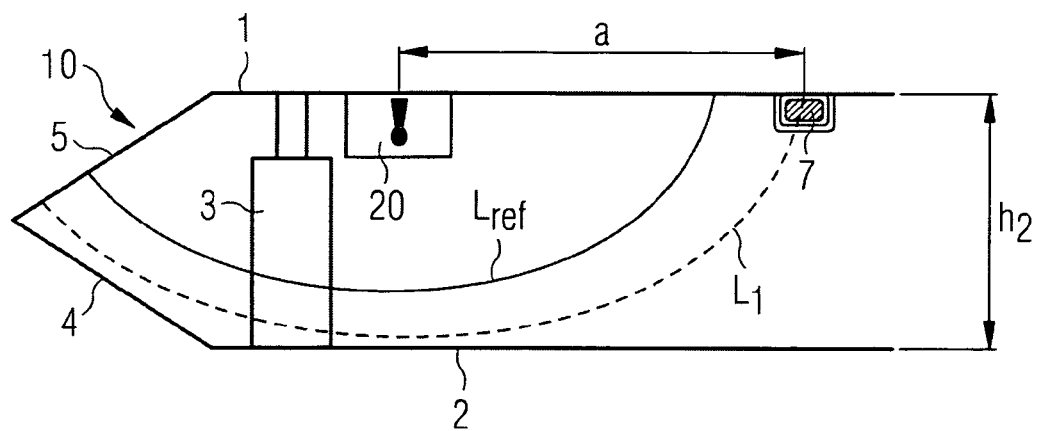
FIG. 2 shows diagrammatically greatly simplified by means of the same support shield at a second extended height the variations of the signal field strengths occurring with the same transmitted signal.
Figure 3:
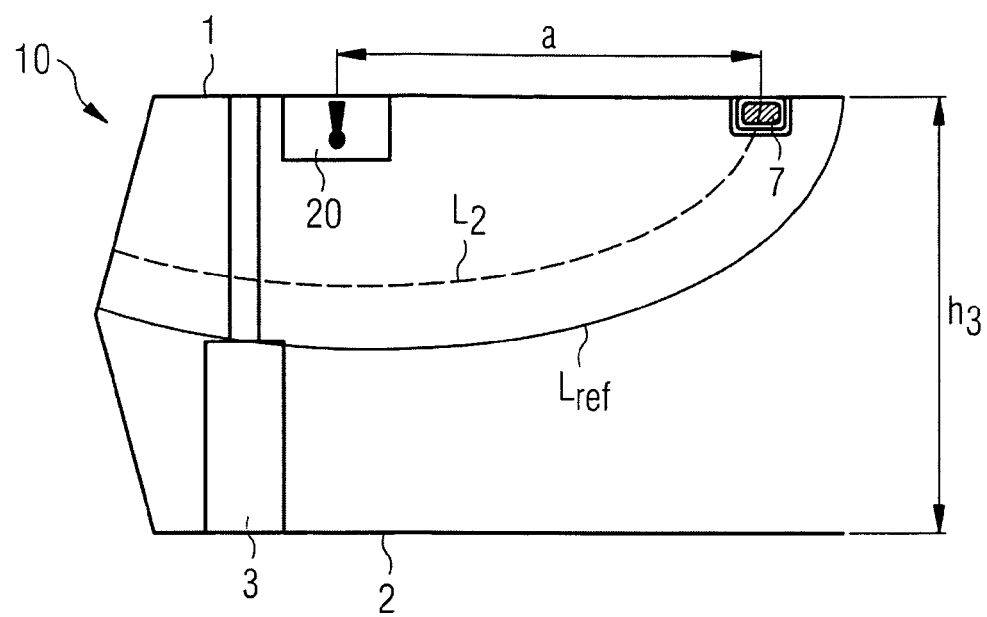
FIG. 3 shows diagrammatically greatly simplified by means of the same support shield at a third extended height the variations of signal strength of the transmitted signal occurring.

FIGS. 1 to 3 show diagrammatically greatly simplified a support shield 10 for face construction which comprises in a familiar manner a shield cap 1, serial horizontal runners 2, hydraulic posts 3, thrust-supported and acting between these runners, and a lemniskaten guide rod gearing 4 with gob shield 5, via which guide rod gearing, together with the hydraulic posts 3, the shield cap 1 can be moved in parallel with the horizontal runner 2 at different heights and tensioned against the overburden of an underground extraction face at which minerals such as, e.g., coal are mined in long wall operation. At the face, over 50 similar support shields 10 are normally directed side-by-side next to one another and below the shield cap, a conveyor facility is run in parallel with the working area at which the extraction machine guides itself for mining the minerals. The conveyor facility and an extraction machine are not shown here since the basic configuration is known to the expert in mining.

In the illustrative embodiment shown, a base station 20 is arranged, on the one hand, and, on the other hand, a reference transponder 7, at the shield cap 1 of the shield support 10, wherein the distance a between the base station 20 and the reference transponder 7 is permanently and unchangeably predetermined and stored in a control unit, not shown separately, which for example, could form a component of the base station 20. The base station 20 and the reference transponder 7 are designed for utilizing the RFID technology and could integrally comprise, on the one hand, a transmitting unit and, on the other hand, a receiving unit in order to be able to receive response signals of the reference transponder 7 and/or a response signal of a non-machine-related personal RFID tag 8 indicated only diagrammatically in FIG. 1.

The interaction between a base station 20 and an RFID transponder will now be explained by way of example by means of FIG. 10 with reference to a reference transponder 7 according to an especially preferred exemplary embodiment. The base station 20 for the utilization of the RFID technology in accordance with the present disclosure comprises as transmitting unit a transmitter 21 in the shape of, e.g. a low-frequency transmitter by means of which a transmitted signal is generated within a signal field indicated by reference symbol 21' if the transmitter 21 in the base station 20 is activated. The transmitter 21 forms a so-called exciter within the RFID technology. In the illustrative embodiment shown, the base station 20 also comprises as receiving unit a receiver 22 which in this case consists of a radio-frequency receiver. However, the receiver could also be designed to be separate from the base station. The receiver 22 within such a base station 20 is sometimes also called an access point in the RFID technology. To activate and feed the transmitter 21 and receiver 22 with power, the base 20 also has an interface 23 which, apart from a power supply, can also be provided with suitable electronics for actuating and activating the transmitter 21 and for reading out the receiver 22 and at the same time handle a data communication with other base stations and/or with a higher-level central controller or central processing unit which, e.g. could also be arranged aboveground or on the route, via suitable interfaces, for example an Ethernet interface. The reference transponder 7 is in this case formed by an active tag or semi-active tag and it comprises at least one memory chip 13 with identification data, a low-frequency receiver part 14 for receiving the low-frequency waves of the transmitter 21 and a radio-frequency transceiver 15 for sending out a radio-frequency response signal. The reference transponder 7 also comprises an antenna, not shown, in order to be able to receive the lower-frequency transmitted waves and/or send off radio-frequency response waves. The reference transponder 7 is activated by the low-frequency receiver 14 receiving the transmitted wave of the transmitter 21 of the base station 20 in sufficient signal field strength reaching or exceeding the response field strength of the transponder. On reception of a transmitted wave of the transmitter 21 with at least the response field strength, the transceiver part 15 is activated and sends in a radio-frequency response signal, e.g., the identification data stored in the memory chip 13 together with an identification signal to the receiver 22 of the base station 20. The identification signal provides for an unambiguous identification of which transmitter 21 or which base station 20, respectively, has activated the transponder 7. The receiver 22 of the base station 20 then receives via the radio-frequency response signal both information about the identification data on the chip 13 and information about which one of several base stations 20 has activated the reference transponder 7. The radio-frequency response signal of the transceiver 15 can take place, for example, in the 2.4 GHz band whereas the transmitters 21 send a low-frequency signal preferably in the frequency band between 90 kHz and 135 kHz. The reference transponder 7 has in the especially preferred embodiment of the system and method according to the present disclosure additionally also a measuring device 16 for measuring a signal field strength of the signal field 21' present during the activation as will still be explained and it is only activated or only sends its identification code and possibly the incoming and measured signal field strength when the incoming signal field strength at the reference transponder at least reaches the response field strength.

Figure 10:
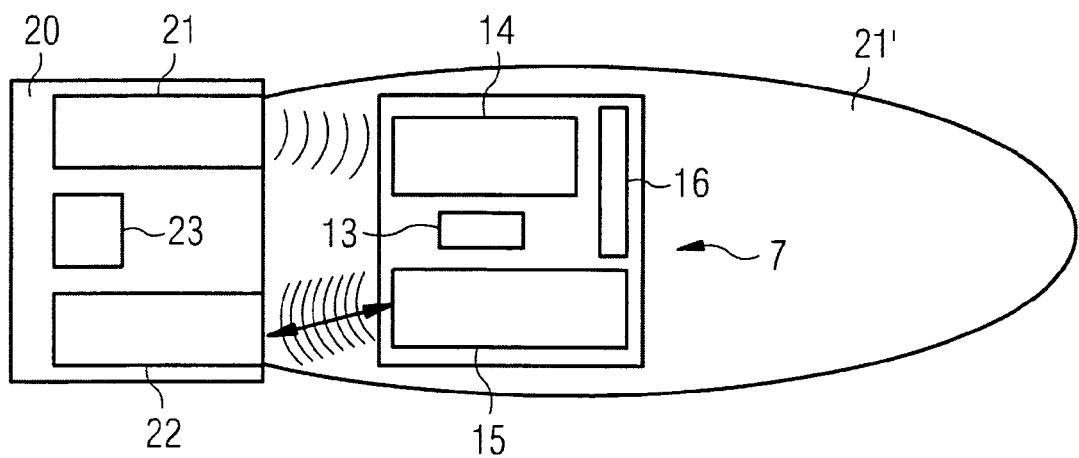
FIG. 10 diagrammatically shows by means of a diagram the structure and the contactless communication between a base station and a transponder.

In principle, the non-machine-related personal tag 8 or a machine tag which is not connected to the shield support 10 can have the same structure as the reference transponder shown in FIG. 10 wherein, as a rule, however, a measuring device for measuring the incoming signal field strength is omitted or is inactive in others than the reference transponder and the non-machine-related transponder or tag is basically activated when it comes into the signal field of the transmitter signal with sufficient signal field strength.

FIG. 1 shows the support shield 10 in a first extended height $H_1$ between horizontal runner 2 and shield cap 1. If at this extended height $h_1$ the base station 20 then radiates a transmit signal 21 with a signal field strength L, a signal field strength $L_{ref}$ can then be measured with the reference tag 7 at distance a from the base station 20 comprising the transmitting unit 21, which is, for example, 100 µV. Since the signal fields are radiated cubically, the field variation of the field line with these signal field strengths can correspond, e.g., to the continuous line for the signal field strength $L_{ref}$. The small-dashed line in FIG. 1 indicates the variation of the signal field strength at which the field radiated by the transmitter 21 of the base station 20 now only has a signal field strength $L_1$ of, for example, 80 µV whereas the long-dashed line corresponds to a signal field strength variation having a signal field strength $L_2$ of, for example, 120 µV. The numerical values specified are purely illustrative.

If then the extended height of the shield 10 is reduced to the extended height $h_2$, this can lead, e.g., to a change in the signal field strength arriving at the reference transponder 7 due to the steel masses of the horizontal runner 2 although the distance is constant with a and there is therefore no distance-related weakening in the signal field strength. As indicated illustratively in FIG. 2, a signal field strength of $L_1$ can be present at the reference transponder 7, this signal field strength being lower here than the value of the signal field strength $L_{ref}$. In the case of a greater vertical length or lifting height of the support shield 10 as shown, for example, in FIG. 3 with the extended height $h_3$, the change of the signal field strength arriving at the reference transponder 7 can reverse and at the reference transponder 7 there will be, for example, a signal field strength $L_2$ which is higher than the reference field strength $L_{ref}$ whereas the variation of the field line of the reference field strength $L_{ref}$ follows at a greater distance from the base station 20 than the distance a between base station 20 and reference transponder 7. The cause for the changes in the signal field strength at distance a at the reference transponder 7 are the environmental influences such as, especially, the influences due to the changes in distance of the steel masses of the support shield itself, an adjacent support shield, a passing extraction machine, a different distance of the conveyor facility and the like.

In order to recognize a non-machine-related tag such as, e.g., the personal tag 8 indicated in FIG. 1 reliably within a safety margin in spite of these influences, without having to permanently radiate a transmit signal with a maximum transmit power and in order to obtain at the same time approximately information about the distance of the detected non-machine-related personal tag 8 from the transmit unit or base station 20, respectively, a calibration cycle takes place during a measuring cycle or following a measuring cycle, in which a transmit power, radiated by the transmit unit 21 within the base station 20, or field strength L is changed in dependence on the response signal of the reference transponder 7. For this purpose, different methods can be used depending on the operation of the reference tag 7 as will now be explained.

If the reference tag is a transponder without a measuring device, a calibration cycle can be regularly initiated in which the signal field strength of the transmitter signal radiated by the transmit unit is iteratively changed from cycle to cycle in such a manner until a reference limit signal field strength is determined for the transmit signal delivered, the undercutting of which does not result in an activation of the reference transponder. Since the distance a between the reference transponder 7 and the base station 20 is permanently predetermined and known to the control unit, especially if the extended height or the jigging state of the support shield is known in the control unit and a basic reference field strength, at which the reference transponder would normally not have been allowed to be activated without environmental influences, is stored for this extended length, a proportionality factor can be formed from the ratio of the reference limit signal field strength currently determined in the calibration cycle and the basic reference signal field strength, by which factor the signal field strength of the transmitter signal must be increased with respect to a basic signal field strength in order to be able to cover a predetermined minimum safety range with the transmitting unit within the base station 20 so that tags other than the reference tag 7 such as, for example, a personal tag 8, are reliably detected within the safety area as soon as they are located within this area.

Figure 4:
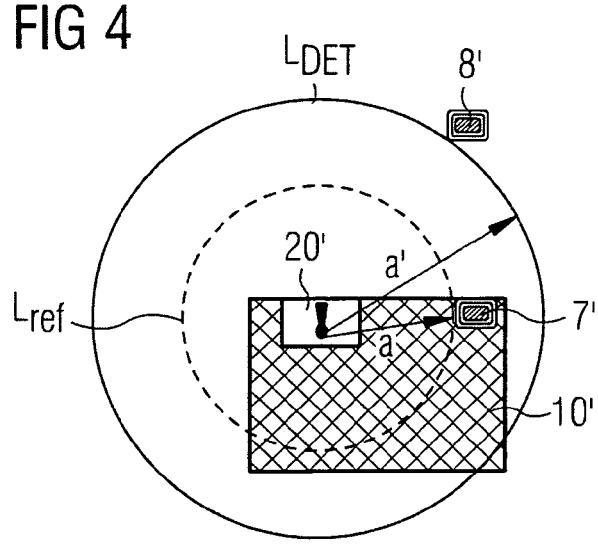
FIG. 4 shows by means of a diagram the situations in the case of a machine frame at which base unit and reference transponder are mounted.

However, the preferred embodiment consists in using reference tags 7 with a measuring device 16 for the signal field strength currently arriving at the level of the reference tag 7. FIG. 4 illustrates by means of a diagrammatically indicated machine frame 10' the possible conduct of the method. The reference tag 7 is arranged at a predetermined distance a from the transmitting unit 20'. It is intended that a non-machine-related tag 8' is to be detected within the detection radius a'. For this purpose, the transmitting power of the transmitting unit 20 must be exactly great enough so that the signal field strength exactly corresponds to $L_{DET}$ at the distance a'. Since the environmental conditions can change, the radius of the field can change with the same transmitting power. For this reason, it is necessary continuously to control the transmitting power of the transmitting unit 20'.

To control the signal field strength, the signal field strength arriving at the reference tag 7' is measured and adapted in such a manner that the desired signal field strength $L_{DET}$ is present at the detection radius a'. To control the signal field strength, there is always a reference tag 7' which is distant from the base unit 20 at a certain distance a. Due to the approximately spherical propagation of the electromagnetic signal field, the signal field strength currently arriving is reduced cubically with increasing radius. This results in a proportionality factor for the signal field strength in dependence on the distance from the transmitter with $$k(a, a') \sim \left(\frac{a}{a'}\right)^3.$$

If the signal field strength $L_{Det}$ is to be adjusted at distance a' in the detection area, $L_{Ref}$ is distinctly greater than $L_{Det}$. It is important to know, therefore, how great $L_{Ref}$ must be to be able to correctly adjust the transmitting power P. $L_{Ref}$ is dependent on k, the transmitting power P of the transmitting unit 20 and the environment U:

$$L_{ref} = f(P, k, \text{Environment}).$$

In addition, the following relations apply approximately in the near field for the distance-dependent decrease in signal field strength:

$$L_{Det} = L_{Ref} \cdot k$$

$$L_{Ref} = \frac{L_{Det}}{k} \approx \frac{L_{Det}}{\left(\frac{a}{a'}\right)^3}.$$

If $L_{Ref}$ is known, this value can be used for controlling. $L_{Meas}$ is the value which is transmitted by the reference tag 7' to the control unit for the transmitter of the transmitting unit 20. If control is effected for $L_{Ref}$, the following must hold true:

$$L_{Meas} = L_{ref} = L_{Det}/k$$

For controlling the transmitting power, various given factors may be present. The reference tag 7' could be arranged at the outer edge of the desired safety range or detection range, respectively so that then factor k=1 because of a=a'. The transmitting power is then controlled in such a manner that the signal field strength $L_{Det}$ arrives at the reference tag 7' and is measured. Since, however, the detection radius is outside the mobile machine, i.e., since the detection range is normally greater than the distance available at the machine for attaching the reference tag, this is a rare special case.

In a normal case, the distance a of the reference tag 7' is less than the diameter a' of the detection range. To adapt the transmitting power, the antenna can be electrically changed in such a manner that, although the reference tag 7' is closer to the antenna and therefore measures a higher signal field strength than $L_{Det}$ at the limit of the safety range monitored, this is detected as $L_{Ref}$. Controlling can then be done as in the special case of k=1 but the receiving power of the antenna of the reference tag 7' must become less sensitive by a defined measure.

More advantageously than the aforementioned electromechanical solution, the transmitting power of the transmitting unit can also be controlled via the measured signal field strength value $L_{Meas}$ measured at the reference tag for which purpose this value is delivered back to the transmitting unit.

INDUSTRIAL APPLICABILITY

Figure 5:
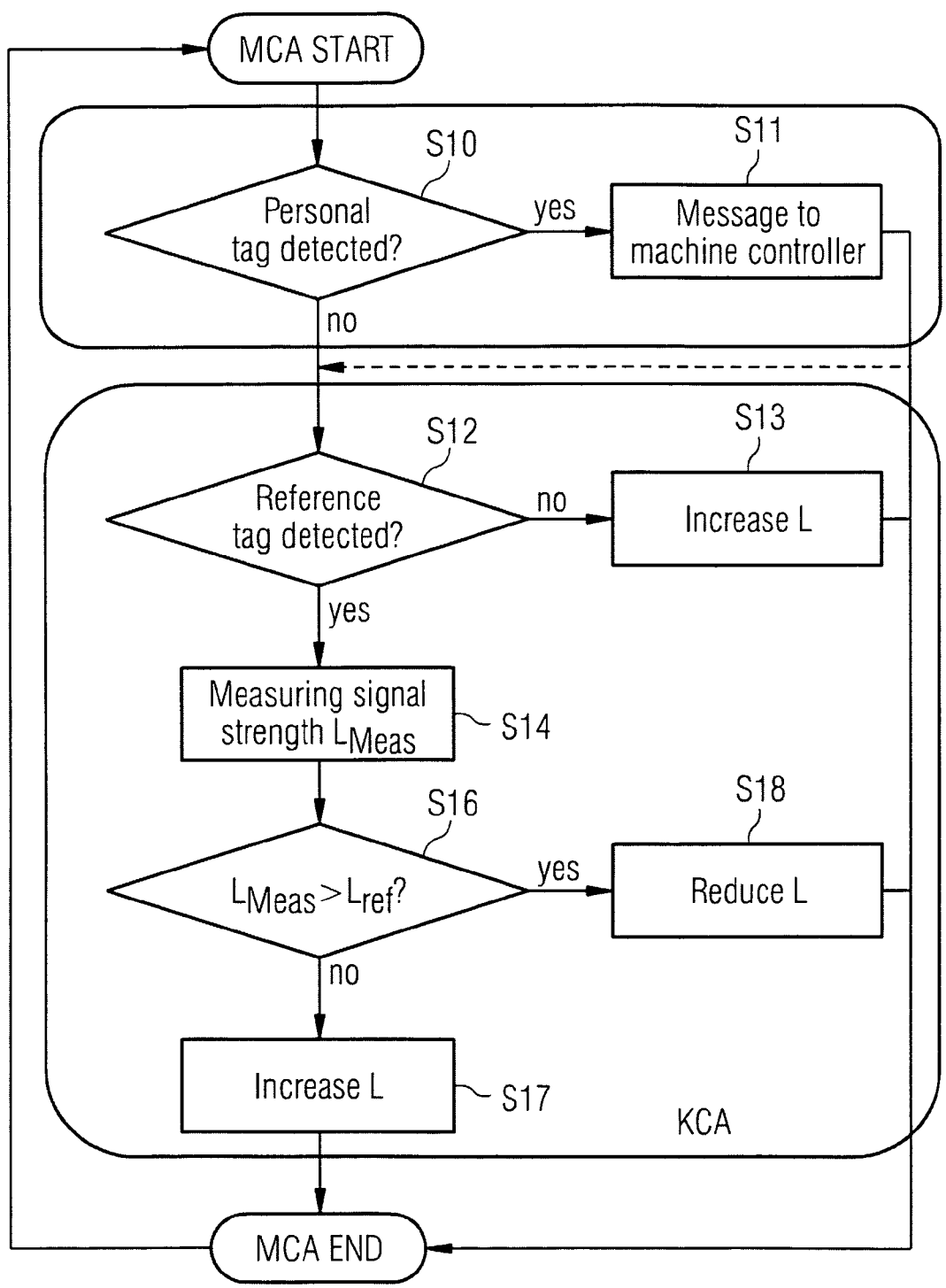
FIG. 5 shows by means of a flowchart the sequence of measuring and calibration cycle in a first variant of the method.

In this respect, FIG. 5 shows a first possible method sequence for the sequential progress of a measuring cycle MCA plus calibration cycle KCA. The transmitting unit of the base station transmits a transmit signal with a fitting signal field strength determined last, or a signal field strength L. If then a personal tag 8 is detected by the receiving unit as shown in step S10 in the flowchart of FIG. 5, a corresponding message is output to the machine controller as indicated with step S11 as a result of which the safety functions stored in the machine controller are activated so that an accident is prevented because, e.g., a personal tag has been located. Furthermore, a calibration cycle KCA starts wherein it is checked in a first step S12 whether a reference tag 7 is detected. If not, the signal field strength is increased as indicated in step S13, the calibration cycle KCA is ended and a new measuring cycle started with higher signal field strength L. If, in contrast, the reference tag 7 is detected in step S12, the currently present signal field strength is measured in a next step by means of the measuring device 16 within the reference tag 7, as indicated in step S14, and the signal field strength measurement value $L_{Meas}$ determined in step S14 is compared with the reference signal field strength $L_{Ref}$ for the reference transponder 7 in step S16. In this context, the relation between $L_{Ref}$, $L_{Det}$ and k, explained above, applies. If the measured signal field strength $L_{Meas}$ is greater than the reference signal field strength $L_{Ref}$, the signal field strength L is reduced for the next measuring cycle as indicated in step S18, or it is increased for the next measuring cycle as indicated in step S17 or may remain unchanged if the measured signal field strength measurement value $L_{Meas}$ corresponds to the predetermined reference signal field strength $L_{ref}$. Subsequently, a new measuring cycle MCA starts immediately with possibly following calibration cycle KCA. For example, up to three measuring cycles MCA can run within one second.

Figure 6:
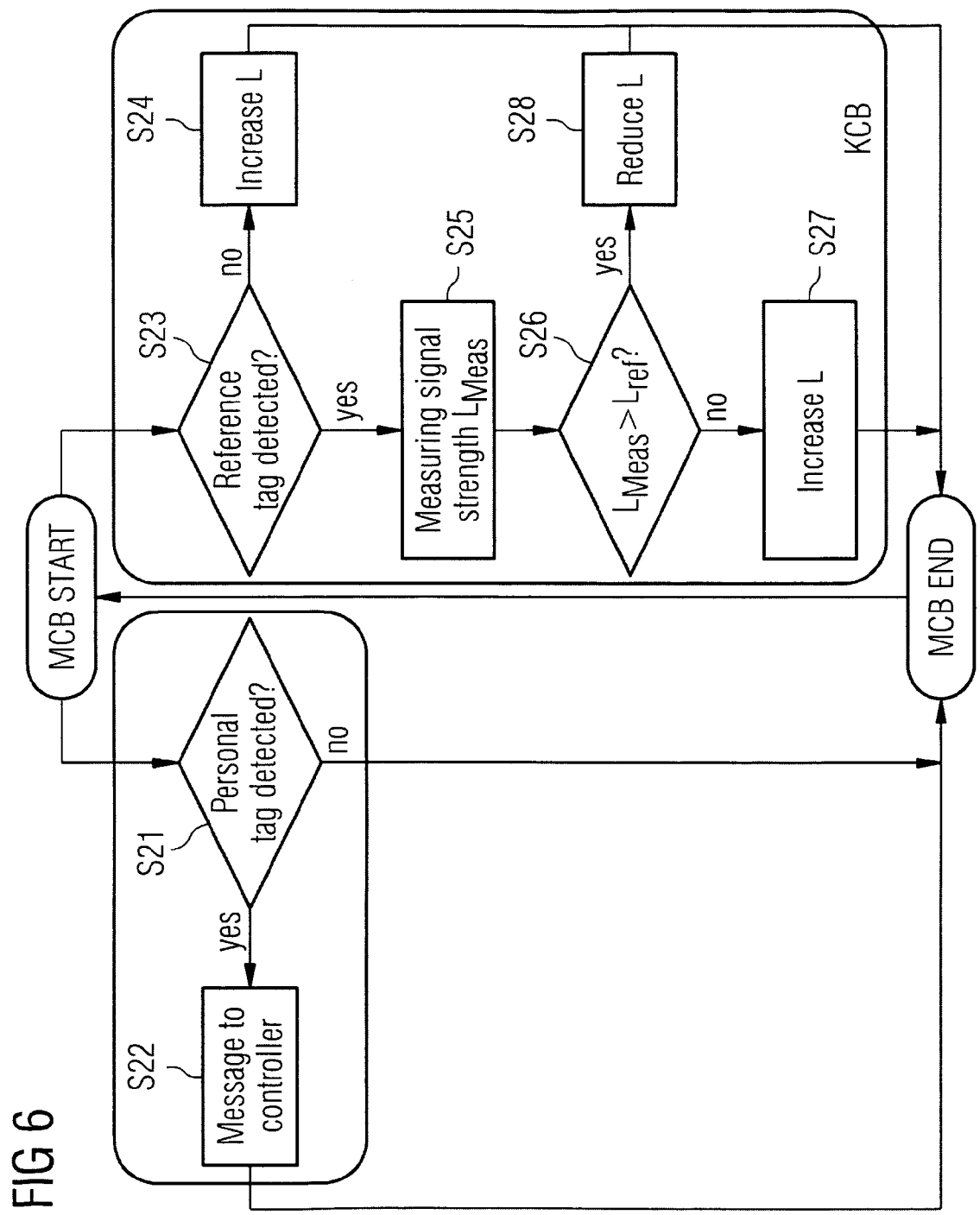
FIG. 6 shows by means of a flowchart the sequence of measuring and calibration cycle in a second variant of the method.

In an alternative conduct of the method, the measuring cycle MCB and the calibration cycle KCB progress independently of one another essentially in parallel with one another. This is illustrated in FIG. 6. With the start of the alternative measuring cycle MCB, the receiving unit is checked, on the one hand, as indicated in step S21 to ascertain whether a personal tag 7 has been detected and in the case of a detection, a message is again sent to the machine controller as represented in step S22. In parallel therewith, the calibration cycle KCB takes place in which it is checked in step S23 whether the reference tag 7 has been detected and, depending on this information of the reference tag, either the signal field strength L is increased (step S24) and a new measuring cycle MCB started with parallel calibration cycle KCB, or else, as indicated in step S25, the signal field strength $L_{Meas}$ is measured and compared with a reference field strength $L_{Ref}$ as indicated in step S26. If the measured signal field strength $L_{Meas}$ exceeds the reference signal field strength $L_{Ref}$, step S28 is initiated and the signal field strength L is reduced for the next cycle MCB/KCB. If the two are approximately equal, the next cycle is started with the same signal field strength L. If the measured signal field strength $L_{Meas}$ is less than the reference signal field strength $L_{Ref}$, step S27 is initiated and the signal field strength L is increased for the next cycle MCB/KCB. From a comparison of the measured signal field $L_{Meas}$ with the reference signal field strength, it can be estimated, taking into consideration the distance a, how far the safety range or detection range monitored by the signal wave extends and thus also estimated at what distance from the transmitter of the base station a non-machine-related tag 8 detected for the first time is located.

Figure 7:
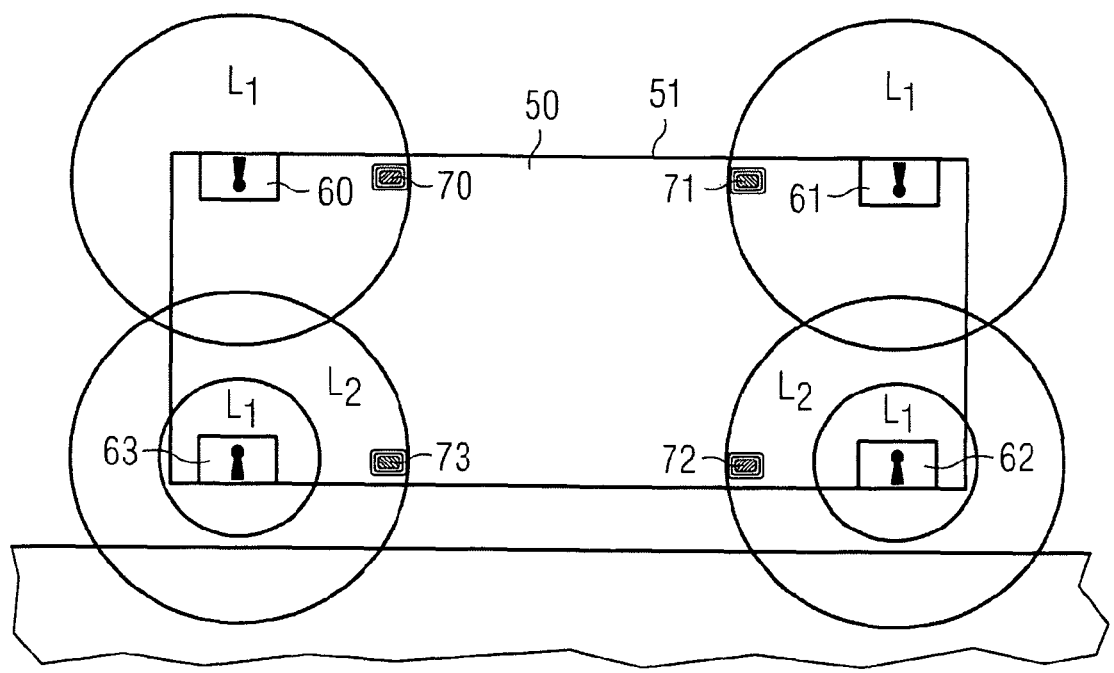
FIG. 7 shows diagrammatically greatly simplified by means of a movable extraction machine with four base stations and reference transponders the signal fields occurring with different signal field strengths of the transmitted signal.
Figure 8:
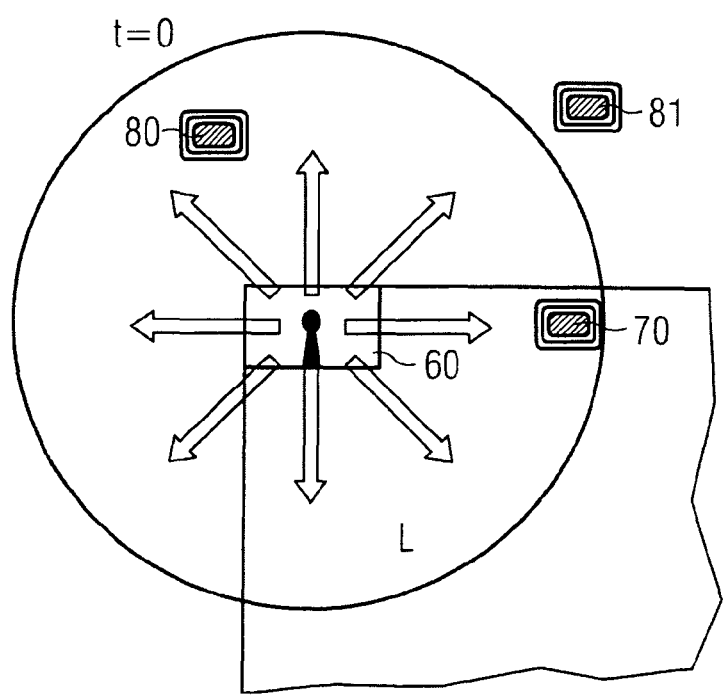
FIG. 8 shows with the extraction machine according to FIG. 7 the activation of tags by means of one of the base stations in a measuring cycle at a first time t=0.
Figure 9:
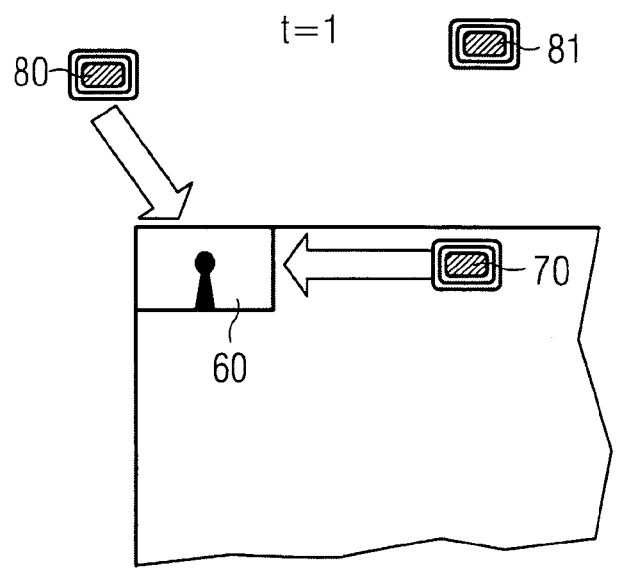
FIG. 9 shows in the extraction machine according to FIG. 7 the locating of a personal tag in a measuring cycle at a second time t=1.

FIG. 7 shows the utilization of the RFID technology according to the present disclosure illustratively with a movable extraction machine 50 with a machine frame 51 which can be moved in any direction by means of an undercarriage, not shown, such as, for example, a tracked undercarriage, or by means of wheels. On the machine frame 51, a base station 60, 61, 62, 63 with transmitting unit is arranged near each of the four corners of the in this case essentially rectangular machine frame 51, and for each base station 60-63, a separate reference transponder 70-73 is mounted on the machine frame 51 at a predetermined distance from the transmitter or from the base station, respectively. The transmitting units of all the base stations 60, 61, 62, 63 radiate a transmit signal with a signal field strength of, for example, L which, due to the distance-dependent drop in signal field strength leads to field lines around the base station having different signal field strengths as indicated with line $L_1$ around the individual base stations 60 and 61 at a distance from the reference tags 70 and 71. The two base stations 62 and 63, in contrast, are under the environmental influence, for example, of a gallery wall reinforced with metal struts, or the like and the signal field strengths radiated by the transmitter of the base stations 62, 63 only leads to a considerably smaller signal field having the signal field strength $L_1$ whereas the signal field at the distance of the reference tags has a signal field strength $L_2$ which is considerably smaller than $L_1$. FIGS. 8 and 9 show for this situation the activation and detection or non-detection of non-machine-related tags 80 and 81 with the base station 60. Whereas the base station 60 activates the transponder 80 (time t=0) which is within the safety range of the signal field L, the tag 81 is outside the transmitter wave or the signal field strength arriving at the tag 81 is lower than the response field strength of the tag 81 and it is not activated. At time t=1, the two activated tags 70, 80, as indicated by the arrows in FIG. 9, send their response signal to the base unit 60, but not the still deactivated tag 81. By means of the reference tag 70, it is checked at the same time, according to the method described above, whether the signal field strength of the transmitter signal is sufficient for covering the safety range which would be guaranteed in the case of the base stations 60 and 61 in FIG. 7 if $L_1 = L_{ref}$, and would not be guaranteed for the base stations 62 and 63 because the signal field strength of the transmitter signals radiated by these would have to be increased because of the influence of the gallery wall so that a sufficiently large safety range is covered by the signal wave.

For an expert, the preceding description provides numerous modifications which are intended to fall within the protective range of the appended claims. Correcting the transmitting power can be done in such a manner that at the reference tag, a predetermined reference field strength is always present which, at the same time, by comparison with a basic field strength and knowing the distance between reference tag and base station, provides information about whether a detected non-machine-related personal tag or machine tag is within the hazard area or still outside the endangered area. The environmental influences can also lead to the range of the signal field extending from one to another measuring cycle although the signal field strength has not been changed. The reference transponders could also be provided with other measuring devices or sensors. The numerical values specified for the signal field strengths serve only to illustrate the inventive concept.

The invention claimed is:

1. A method for increasing operational safety of a mobile machine in aboveground or underground mining operations for extraction of minerals by utilizing RFID technology, the method comprising:
   providing a transmitting unit at the mobile machine for activation of at least one non-machine-related transponder and/or a reference transponder, via a transmitter signal of the transmitting unit;
   providing a receiving unit at the mobile machine, wherein the receiving unit is configured to receive responses from the at least one non-machine-related transponder and the reference transponder based on said activation, wherein the at least one non-machine-related RFID transponder is contactlessly detectable by the receiving unit upon said activation;
   providing a control unit for actuating the transmitting unit and evaluating transponder signals, from said reference transponder, detected by the receiving unit in measuring cycles;
   providing said reference transponder mounted on the mobile machine at a defined distance from the transmitting unit, the defined distance being stored in the control unit so that a signal field strength (L) of the transmitter signal can be adjusted while taking consideration of a response from said reference transponder and said defined distance;
   adjusting said signal field strength (L) of the transmitter signal of the transmitting unit based on said response signal received from the reference transponder in a calibration cycle that is used for optimizing a measurement for said signal field strength for eliminating environmental influences so that the at least one non-machine-related transponder is able to be detected within a safety radius that is desired around the transmitting unit during said activation.

2. The method according to claim 1, further comprising: performing the calibration cycle at predetermined intervals between the measuring cycles.

3. The method according to claim 1, further comprising: starting the calibration cycle when the at least one non-machine-related RFID transponder signal is detected by the receiving unit in a measuring cycle.

4. The method according to claim 1, wherein the calibration cycle includes one or more part-cycles, the method further comprising:
   iteratively changing the signal field strength from a first part-cycle to a second part-cycle until a reference limit signal field strength is established, the falling below of which does not result in an activation of the reference transponder.

5. The method according to claim 4, further comprising: in a measuring cycle preferably immediately following the calibration cycle, sending out the transmitter signal by the transmitting unit in the signal field strength which, taking into consideration the reference limit signal field strength, covers a predetermined minimum safety range around the transmitting unit.

6. The method according to claim 4, further comprising: deriving a proportional factor, from the reference limit signal field strength and a basic reference signal field strength, by means of the control unit, by which a factor of the signal field strength of the transmitter signal must be changed so that the at least one non-machine-related transponder is detected within the safety radius.

7. The method according to claim 1, further comprising: using the signal field strength actually arriving at the reference transponder for adjusting the signal field strength for a subsequent measuring cycle or a subsequent calibration cycle.

8. The method according to claim 7, further comprising: delivering back the signal field strength to the transmitting unit or the control unit, respectively, as a signal field strength measurement value, wherein the signal field strength is adjusted for at least one of the subsequent measuring cycle or the subsequent calibration cycle based on the signal field strength measurement value measured at the reference transponder.

9. The method according to claim 8, further comprising: controlling the signal field strength of the transmitter signal for the at least one of the subsequent measuring cycle or the subsequent calibration cycle in such a manner that the signal field strength measurement value measured at the reference transponder corresponds to a reference signal field strength.

10. The method according to claim 8, further comprising: activating the reference transponder with a reference signal field strength, wherein the signal field strength of the transmitter signal is adjusted in such a manner that the signal field strength arriving at the reference transponder corresponds to the reference signal strength.

11. The method according to claim 7, wherein the reference transponder is provided with a signal field strength measuring device for measuring an incoming signal field strength of the transmitter signal and with a communication device for communicating a signal field strength measurement value to the control unit of the transmitting unit.

12. The method according to claim 7, wherein the reference transponder is designed for a reference signal field strength as activation signal field strength.

13. The method according to claim 1, wherein the mobile machine comprises a support shield of a shield support and the at least one non-machine-related RFID transponder is at least one of a personal tag or a machine tag attached to an extraction machine which can be moved along a conveying device.

14. The method according to claim 1, wherein the mobile machine is an extraction machine provided with a tracked undercarriage at a machine frame of which four transmitting units and four reference transponders are mounted.

15. A system for increasing operational safety of a mobile machine in aboveground or underground mining operations for extraction of minerals by utilizing RFID technology, comprising:
a transmitter unit at a mobile machine configured to send out a transmitter signal with a changeable signal strength and for activation of at least one non-machine-related transponder and/or a reference transponder, via a transmitter signal of the transmitting unit;
a receiving unit at the mobile machine configured to receive responses from the at least one non-machine-related transponder and the reference transponder based on said activation, wherein the at least one non-machine-related RFID transponder is configured to be contactlessly detectable by means of the receiving unit upon said activation;
the reference transponder mounted at the mobile machine at a defined distance from the transmitting unit; and
a control unit for actuating the transmitting unit and evaluating transponder signals, from said reference transponder, detected by the receiving unit in measuring cycles, the control unit storing the defined distance, so that said signal strength of the transmitter signal can be changed while taking consideration of a response from said reference transponder and said defined distance, wherein the control unit is further configure to perform a calibration cycle that is used for optimizing a measurement for said changeable signal strength for eliminating environmental influences so that the at least one non-machine-related transponder is able to be detected within a safety radius that is desired around the transmitting unit during said activation; and
wherein the changeable signal strength of the transmitting unit is changed based on a response signal received from the reference transponder in the calibration cycle.

16. The system according to claim 15, wherein:
the reference transponder has a response field strength; and
the calibration cycle includes one or more part-cycles, wherein a reference limit signal field strength can be determined by iteratively changing the signal field strength of the transmitter signal, the undercutting of which does not result in an activation of the reference transponder.

17. The system according to claim 15, wherein the reference transponder is provided with a signal field strength measuring device for measuring an incoming signal field strength of the transmitter signal and with a communication device for communicating the signal field strength measurement value to the control unit of the transmitting unit.

18. The system according to claim 15, wherein the reference transponder is designed for a reference signal field strength as activation signal field strength.

19. The system according to claim 15, wherein the mobile machine comprises a support shield of a shield support and the at least one non-machine-related RFID transponder is at least one of a personal tag or a machine tag attached to an extraction machine which can be moved along a conveying device.

20. The system according to claim 15, wherein the mobile machine is an extraction machine provided with an undercarriage at a machine frame of which at least two transmitting units and two reference transponders are mounted.

* * * * *